Jan. 31, 1939.      L. D. OVERLAND      2,145,696
APPARATUS FOR MAKING COMPOSITE FROZEN CONFECTIONS
Filed Sept. 30, 1937      2 Sheets-Sheet 1

INVENTOR.
Leo D. Overland
BY
N. Lee Helms
ATTORNEY.

Jan. 31, 1939.  L. D. OVERLAND  2,145,696
APPARATUS FOR MAKING COMPOSITE FROZEN CONFECTIONS
Filed Sept. 30, 1937  2 Sheets-Sheet 2

INVENTOR.
Leo D. Overland
BY
A. Lee Helmer
ATTORNEY.

Patented Jan. 31, 1939

2,145,696

UNITED STATES PATENT OFFICE 2,145,696

APPARATUS FOR MAKING COMPOSITE FROZEN CONFECTIONS

Leo D. Overland, Brooklyn, N. Y., assignor to Henry Duke, Long Island City, N. Y.

Application September 30, 1937, Serial No. 166,612

4 Claims. (Cl. 107—8)

The object of the present invention is to provide a device for manufacturing composite frozen confections in which the exterior area comprises a given compound and the central area comprises a different compound, each capable of congelation by freezing, and to do so in such manner that the freezing is continuous and the mold assembly is not withdrawn from the brine tank used in the operation, nor is heat applied thereto for defrosting, until the freezing operation is completed.

Confections of the type described have been manufactured in the past, a typical process being described in the patent to LaCorte et al., No. 1,988,906 of January 22, 1935. Such methods are not continuous and hence the processes are relatively expensive, it being customary to remove the molds from the freezing medium when the shell is sufficiently frozen and to fill the hollow cores with relatively warm water to loosen or defrost the core members so that they may be extracted preliminary to filling the frozen shells with a center mix.

As described hereinafter, reference will be made to the accompanying drawings which illustrate a mold and core assembly particularly adapted for making composite frozen confections.

In the drawings—

Figures 1, 2:
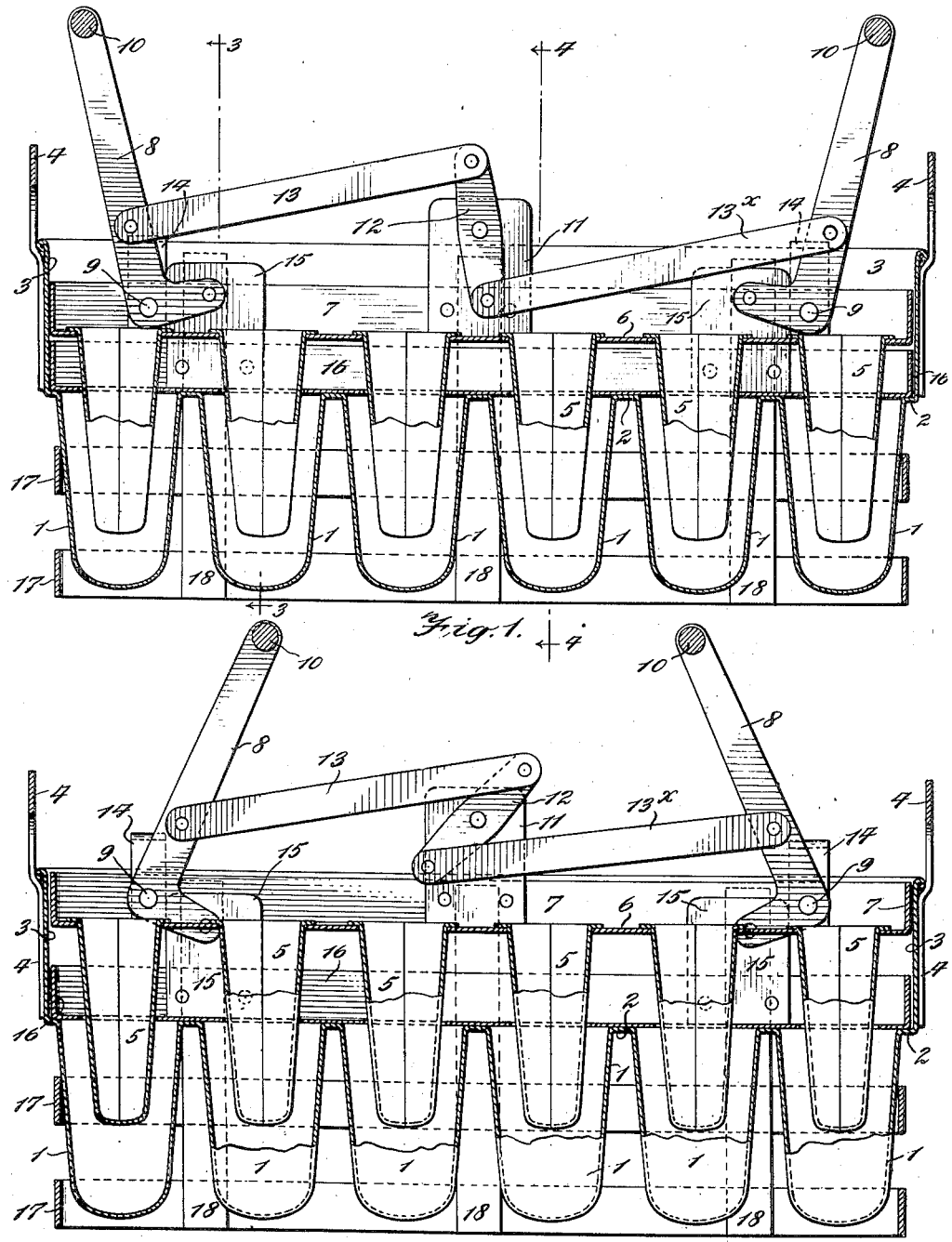
Figure 1 is a sectional elevation of an embodiment of the invention taken generally on the line 1—1, Figure 3, showing the core member at extreme downward position.
Figure 2 is a view similar to Figure 1 showing the core member raised.
Figure 3:
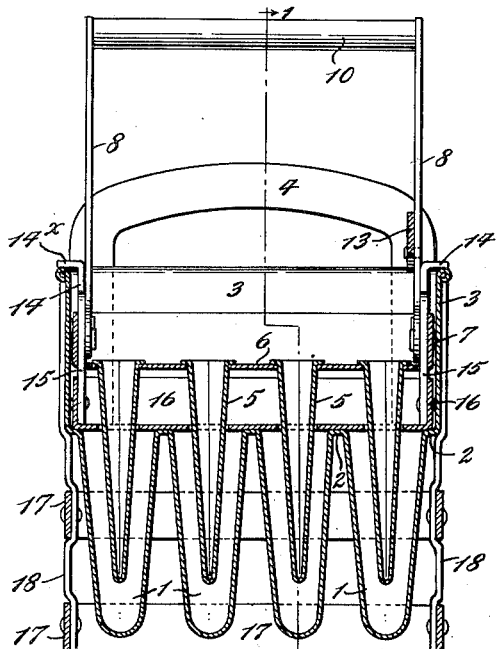
Figure 3 is a transverse sectional elevation on the line 3—3, Figure 1.
Figure 4:
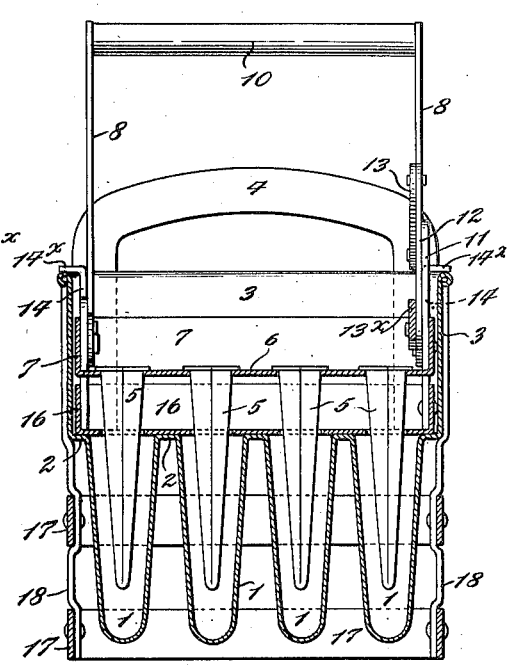
Figure 4 is a transverse sectional elevation on the line 4—4, Figure 1.
Figure 5:
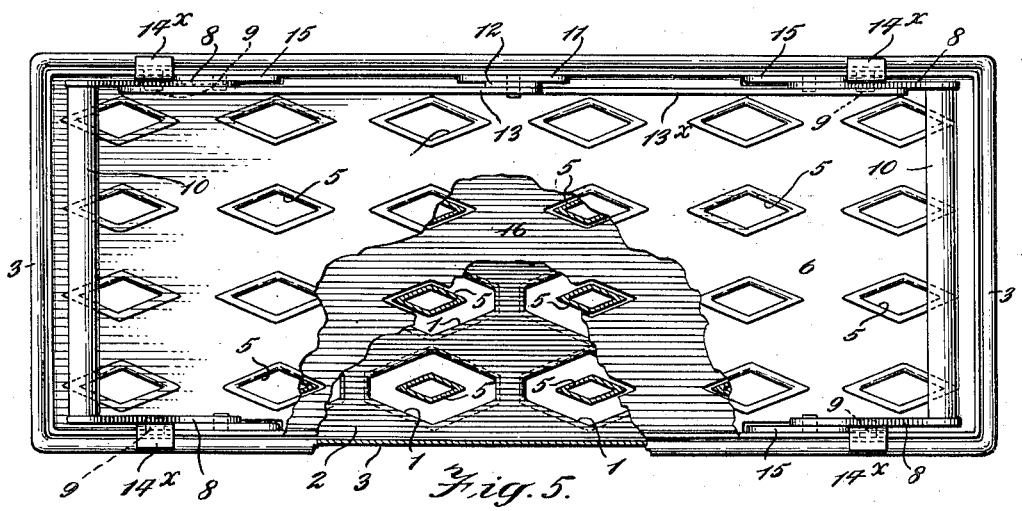
Figure 5 is a plan view of the assembly partly broken away.

Referring to the drawings, I have shown a plurality of molds 1 depending from a horizontal plate 2 which is formed with vertically extending sides 3, the plate with the sides comprising a deep tray. For convenience in lifting the mold assembly handle bracket 4 may be provided at the opposite ends of the tray.

The core member comprises a plurality of hollow tapered cores 5 depending from a horizontal plate 6 having upwardly flanged sides 7 so that the plate and sides form a tray.

Pivoted to each longitudinal side flange 7 of the core member are two levers which are spaced at opposite sides of the longitudinal center of the core member, the levers being indicated at 8 and their pivotal connection with the core member being indicated at 9. Each lever carried at one side of the core member is connected to an opposite lever carried by the opposite side of the core member by means of a connecting handle 10.

The levers are preferably connected by toggles. For this purpose a plate 11 may be riveted or otherwise secured to the core member at one side thereof, the plate having pivoted thereto a toggle lever 12, one end of the toggle lever being connected to a lever 8 by means of a link 13 and the opposite end of the toggle lever being connected to a second lever 8 by means of link 13x. Thus when one of the handles 10 is swung inwardly to the position of Figure 2 a corresponding movement will be imparted to the opposite handle and, of course, the levers which carry the same. The flanged wall 7 may carry guide pieces 14 which may have hooked ends 14x in contact with the upper edge of the mold member when the core member is in lowermost position, these elements not being essential however.

Each lever 8 is pivoted to an abutment member 15 which may directly or indirectly abut the top of the mold. In the present embodiment, the abutment is indirect. To this end each abutment member is riveted or otherwise secured to a tray-like device 16 having a plurality of apertures, each for the passage of a core. It will thus be seen that actuation of the levers 8 will cause the cores to be moved relatively to tray-like member 16 longitudinally of the mold cavities.

In utilizing the apparatus above described, I employ a usual type of open top brine tank and first place the mold member into the brine with such proportion of liquid shell-forming mixture as will be raised the desired height by insertion of the mold cavities to the desired position. After the liquid is placed in the mold cavities the core member is placed in position, the levers 8 being so moved that the cores will descend into the cavities a predetermined degree. If the descent is to the maximum degree the guides 14 will have their stop extensions 14x in contact with the upper rim of the mold. By moving the opposed handles 10 toward or from each other any desired degree of penetration of the mold cavities by the core will be effected.

It will be understood that the first mold assembly containing the shell liquid will be followed in the brine tank by successively other assemblies of the same kind so that the inward assembly will have a progressive movement from one end of the brine tank toward the other end. In the usual size of mold and core, if the brine tank has a temperature from 15–17° F. the shell will be congealed in approximately three minutes. It may be assumed that in a brine tank having a length of 25–30', the movement of the mold will be approximately 3 to 4'. When the shell of the first assembly thus has been congealed, the handles 10 are brought toward each other without any necessity of a defrosting operation. There will be applied to the assembly, force ideally designed to separate the mold member from the core member by withdrawal of the cores from the mold cavities. Immediately the molds are filled completely or to the desired degree by the core mixture and the mold continues its movement until the center is congealed.

By the above apparatus I am enabled to greatly reduce the cost of producing composite frozen confections of the type described.

The downwardly projected mold cavity units may be protected by encircling metallic bands such as those shown at 17 and by vertically extending strips such as those shown at 18 or any other suitable manner.

It will be understood that various modifications may be made in the form and arrangement of the elements comprising the embodiments of the invention illustrated without departing from the spirit of the invention.

Having described my invention, what I claim and desire to secure by Letters Patent, is as follows:—

1. In a mold and core combination for producing composite frozen confections, the combination with a plural cavity mold member, of a plural cavity core member provided with abutment areas for contact with upper surface areas of the mold, a plurality of levers disposed at opposite sides of the center of the core member, each having a fulcrumed pivot on one of said abutment areas and also being pivoted to the core member, whereby simultaneous movement of the levers will exert equal force at opposite sides of the center area of the core member, tending to separate the latter from the mold.

2. In a mold and core combination for producing composite frozen confections, a multiple cavity mold having horizontal abutment areas, a core member having a plurality of cores adapted each to enter a mold cavity, a plurality of levers pivoted to the core member and a plurality of abutment members having pivotal connection with the levers and adapted to engage the mold.

3. A device constructed in accordance with claim 1, in combination with a toggle connection between the levers.

4. In a mold and core combination for producing composite frozen confections, comprising a plural cavity mold, a core member having a plurality of cores each adapted to enter a mold cavity, a plurality of abutment members adapted to contact with the upper surface of the mold, and swinging lever means connected to the abutment members and the core member and adapted to impart relative movement to the mold and core member and adapted to vary the degree of penetration of the core members into the mold cavities.

LEO D. OVERLAND.